US008930948B2

(12) United States Patent
Shanmuganathan et al.

(10) Patent No.: US 8,930,948 B2
(45) Date of Patent: Jan. 6, 2015

(54) OPPORTUNISTICALLY PROACTIVE RESOURCE MANAGEMENT USING SPARE CAPACITY

(75) Inventors: Ganesha Shanmuganathan, Mountain View, CA (US); Anne Marie Holler, Los Altos, CA (US); Pradeep Padala, Sunnyvale, CA (US); Rean Griffith, Oakland, CA (US); Shankari Kalyanaraman, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 261 days.

(21) Appl. No.: 13/530,102

(22) Filed: Jun. 21, 2012

(65) Prior Publication Data

US 2013/0346969 A1 Dec. 26, 2013

(51) Int. Cl.
*G06F 9/455* (2006.01)

(52) U.S. Cl.
USPC .................. 718/1; 718/104; 718/105

(58) Field of Classification Search
None
See application file for complete search history.

(56) References Cited

U.S. PATENT DOCUMENTS

| | | | | |
|---|---|---|---|---|
| 8,095,929 | B1* | 1/2012 | Ji et al. | 718/1 |
| 8,291,411 | B2* | 10/2012 | Beaty et al. | 718/1 |
| 8,321,862 | B2* | 11/2012 | Swamy et al. | 718/1 |
| 8,364,460 | B2* | 1/2013 | Ostermeyer et al. | 703/22 |
| 8,423,998 | B2* | 4/2013 | Isci et al. | 718/1 |
| 8,560,671 | B1* | 10/2013 | Yahalom et al. | 709/224 |
| 8,601,483 | B2* | 12/2013 | He et al. | 718/104 |
| 8,615,579 | B1* | 12/2013 | Vincent et al. | 709/224 |
| 8,667,500 | B1* | 3/2014 | Ji et al. | 718/105 |
| 8,762,525 | B2* | 6/2014 | Devarakonda et al. | 709/224 |
| 2002/0019234 | A1* | 2/2002 | Wright et al. | 455/450 |
| 2007/0002743 | A1* | 1/2007 | Fan | 370/235 |
| 2008/0295096 | A1* | 11/2008 | Beaty et al. | 718/1 |
| 2009/0132840 | A1* | 5/2009 | Talwar et al. | 713/320 |
| 2009/0228589 | A1* | 9/2009 | Korupolu | 709/226 |
| 2010/0191854 | A1* | 7/2010 | Isci et al. | 709/226 |
| 2010/0242045 | A1* | 9/2010 | Swamy et al. | 718/104 |
| 2010/0262964 | A1* | 10/2010 | Uyeda et al. | 718/1 |
| 2011/0072138 | A1* | 3/2011 | Canturk et al. | 709/226 |
| 2011/0225299 | A1* | 9/2011 | Nathuji et al. | 709/226 |
| 2011/0239215 | A1* | 9/2011 | Sugai | 718/1 |
| 2012/0198447 | A1* | 8/2012 | Osogami et al. | 718/1 |
| 2012/0284713 | A1* | 11/2012 | Ostermeyer et al. | 718/1 |
| 2013/0097601 | A1* | 4/2013 | Podvratnik et al. | 718/1 |
| 2013/0139152 | A1* | 5/2013 | Chang et al. | 718/1 |
| 2013/0263117 | A1* | 10/2013 | Konik et al. | 718/1 |

OTHER PUBLICATIONS

Gulati et al.; "Cloud-scale resource management: challenges and techniques"; HotCloud'11 Proceeding of the 3rd USENIX conference on Hot topics in could computing; Publication Date: Jun. 14, 2011; (NPL_Gulati_June142011.pdf; pp. 1-7).*

(Continued)

*Primary Examiner* — Gregory A Kessler
*Assistant Examiner* — Hiren Patel

(57) ABSTRACT

Embodiments perform opportunistically proactive resource scheduling for a plurality of resource-consuming entities. The scheduling is based on both current entitlement (or demand) by the entities and predicted future entitlement (or demand) by the entities. Resources are allocated based on the current demands, while any remaining resource capacity is further allocated to entities based on predicted demands. In some embodiments, the scheduling is performed on a cluster of hosts executing a plurality of virtual machines (VMs) in a virtualized datacenter to implement load balancing.

20 Claims, 7 Drawing Sheets

(56) References Cited

OTHER PUBLICATIONS

VMware; "DRS Performance and Best Practices" 2008; (VMware_2008.pdf; pp. 1-19).*

Unknown, "VMware vSphere vMotion Architecture, Performance and Best Practices in VMware vSphere 5", Technical White Paper, Retrieved at <<http://www.vmware.com/files/pdf/vmotion-perf-vsphere5.pdf>>, 2011, 26 pages.

Gulati et al., "VMware Distributed Resource Management: Design, Implementation, and Lessons Learned", VMware TechPubs, Retrieved from <<http://labs.vmware.com/download/1571>>, 2012, 20 pages.

Mashtizadeh et al., "The Design and Evolution of Live Storage Migration in VMware ESX", USENIX ATC, Jun. 2011, 14 pages.

Gong et al., "Press: PRedictive Elastic ReSource Scaling for cloud systems", CNSM, IEEE, 2010, 8 pages.

Urgaonkar et al., "Resource Overbooking and Application Profiling in Shared Hosting Platforms", OSDI, 2002, 15 pages.

* cited by examiner

OPPORTUNISTICALLY PROACTIVE RESOURCE MANAGEMENT USING SPARE CAPACITY

BACKGROUND

Existing systems provide resource management for a plurality of virtual machines (VMs). For example, some of the existing systems provide reactive management by responding to changes in demand that have already occurred. These reactive management systems perform load balancing operations on a cluster of virtualized hosts based on collected statistics and state information. Such reactive management systems, however, may struggle to handle spikes in demand at least because of the delay incurred in performing the load balancing operations (e.g., moving VMs or VM disks among hosts). For example, the load balancing operations may include hundreds of serialized and/or parallel migrations such as moving VMs and/or VM disks among hosts. The cost of these migrations is higher when the VMs are heavily loaded than when lightly loaded at least because memory associated with the VMs may be changed frequently when heavily loaded.

Other existing systems provide proactive management by predicting changes in demand and performing the load balancing operations in advance of the predicted changes. The proactive management systems, however, may suffer from inaccurate demand predictions thus rendering some of the completed load balancing operations unnecessary. Performing unnecessary load balancing operations before the predicted changes in demand incurs a present cost that may have a negative impact on the performance of current workloads. For example, quality of service expectations may be violated.

SUMMARY

One or more embodiments described herein implement opportunistically proactive resource management for a plurality of virtual machines (VMs). A dynamic entitlement for each of the VMs is calculated based on current demands corresponding thereto. Based on a comparison of the current demands and predicted future demands for each of the VMs, one or more of the VMs is identified or selected to receive excess capacity. The excess capacity is allotted to the identified VMs, and the dynamic entitlement is updated to reflect the allocation. Load balancing among the VMs occurs based on the updated dynamic entitlement.

Some embodiments described herein further predict the future demands with a prediction horizon relative to an estimated duration associated with performance of load balancing operations.

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Figure 1:
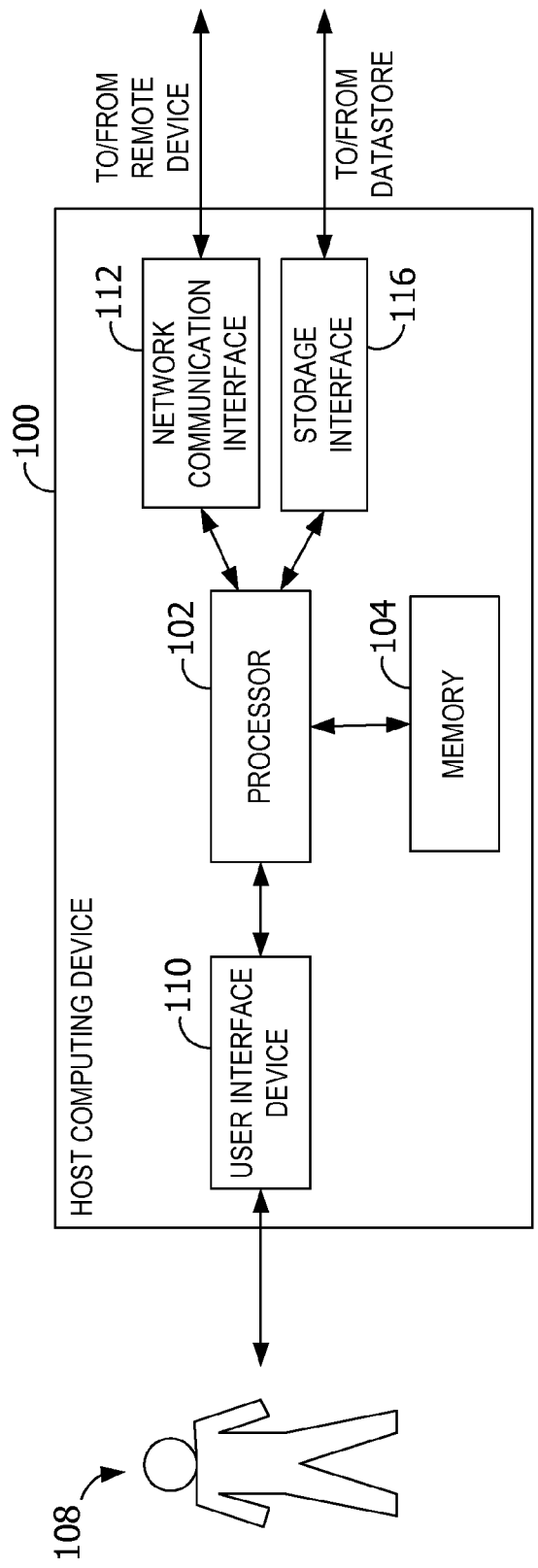
FIG. 1 is a block diagram of an exemplary host computing device.

Embodiments described herein implement opportunistically proactive resource management for a plurality of resource-consuming entities. In some embodiments, resource management is performed for a cluster 316 of host computing devices 100 executing virtual machines (VMs) in a virtualized datacenter. Resources are allocated based on current demands and on predicted demands for the VMs. For example, after allocating resources based on the current demands, any remaining, spare, or excess capacity in cluster 316 is then allocated to the VMs based on the predicted demands. By funding the predicted demands with only the spare capacity in cluster 316 in some embodiments, any negative impact to current workloads is eliminated. Additionally, the spare capacity is allocated to the VMs before the predicted increase in demand by the VMs.

Predicted demands for VMs may be inaccurate using existing prediction algorithms. For example, it is difficult to make accurate predictions over quantities (e.g., signals) that are noisy (e.g., high variance) and non-stationary (e.g., described by time-varying parameters), such as those in virtualized datacenters. The variations in demand may be abrupt, aperiodic, and sometimes transient due at least to the different workloads sharing the same infrastructure in the datacenter and the overheads caused by many abstraction layers. Further, application or operating system reconfigurations such as automatic updates in VMs may not be visible to prediction algorithms.

Accordingly, aspects of the disclosure provide improved VM workload performance while accommodating the inherent uncertainty in the precision, accuracy, or other quality of the predicted demands of diverse sets of workloads in private clouds. In this manner, aspects of the disclosure accept the reality of prediction inaccuracies yet perform well regardless of the quality of the prediction For example, there is less clipped demand in opportunistically proactive resource management relative to fully reactive or fully proactive (e.g., non-opportunistic) resource management.

Further, performing load balancing prior to the predicted increase in demands for the VMs is more efficient. For example, migrating less active VMs is more efficient because VM memory is being changed less frequently and the VM may be de-scheduled more often without noticeably impacting the current workload.

Aspects of the disclosure may execute in, or be a part of, a cloud operating system, load balancer, or other computing device 304 that manages resources for a plurality of entities. In some embodiments, aspects of the disclosure extend reactive systems to implement proactive resource management while accommodating imprecise demand prediction. For example, aspects of the disclosure extend resource management solutions such as the Distributed Resource Scheduler (DRS), Distributed Power Management (DPM), and Storage Distributed Resource Scheduler (SDRS) provided by VMware, Inc. An exemplary virtualized environment is next described.

FIG. 1 is a block diagram of exemplary host computing device 100. Host computing device 100 includes a processor 102 for executing instructions. In some embodiments, executable instructions are stored in a memory 104. Memory 104 is any device allowing information, such as executable instructions and/or other data, to be stored and retrieved. For example, memory 104 may include one or more random access memory (RAM) modules, flash memory modules, hard disks, solid state disks, and/or optical disks.

Host computing device 100 may include a user interface device 110 for receiving data from a user 108 and/or for presenting data to user 108. User 108 may interact indirectly with host computing device 100 via another computing device such as VMware's vCenter Server or other management device. User interface device 110 may include, for example, a keyboard, a pointing device, a mouse, a stylus, a touch sensitive panel (e.g., a touch pad or a touch screen), a gyroscope, an accelerometer, a position detector, and/or an audio input device. In some embodiments, user interface device 110 operates to receive data from user 108, while another device (e.g., a presentation device) operates to present data to user 108. In other embodiments, user interface device 110 has a single component, such as a touch screen, that functions to both output data to user 108 and receive data from user 108. In such embodiments, user interface device 110 operates as a presentation device for presenting information to user 108. In such embodiments, user interface device 110 represents any component capable of conveying information to user 108. For example, user interface device 110 may include, without limitation, a display device (e.g., a liquid crystal display (LCD), organic light emitting diode (OLED) display, or "electronic ink" display) and/or an audio output device (e.g., a speaker or headphones). In some embodiments, user interface device 110 includes an output adapter, such as a video adapter and/or an audio adapter. An output adapter is operatively coupled to processor 102 and configured to be operatively coupled to an output device, such as a display device or an audio output device.

Host computing device 100 also includes a network communication interface 112, which enables host computing device 100 to communicate with a remote device (e.g., another computing device) via a communication medium, such as a wired or wireless packet network. For example, host computing device 100 may transmit and/or receive data via network communication interface 112. User interface device 110 and/or network communication interface 112 may be referred to collectively as an input interface and may be configured to receive information from user 108.

Host computing device 100 further includes a storage interface 116 that enables host computing device 100 to communicate with one or more of datastores 316, which store virtual disk images, software applications, and/or any other data suitable for use with the methods described herein. In exemplary embodiments, storage interface 116 couples host computing device 100 to a storage area network (SAN) (e.g., a Fibre Channel network) and/or to a network-attached storage (NAS) system (e.g., via a packet network). The storage interface 116 may be integrated with network communication interface 112.

Figure 2:
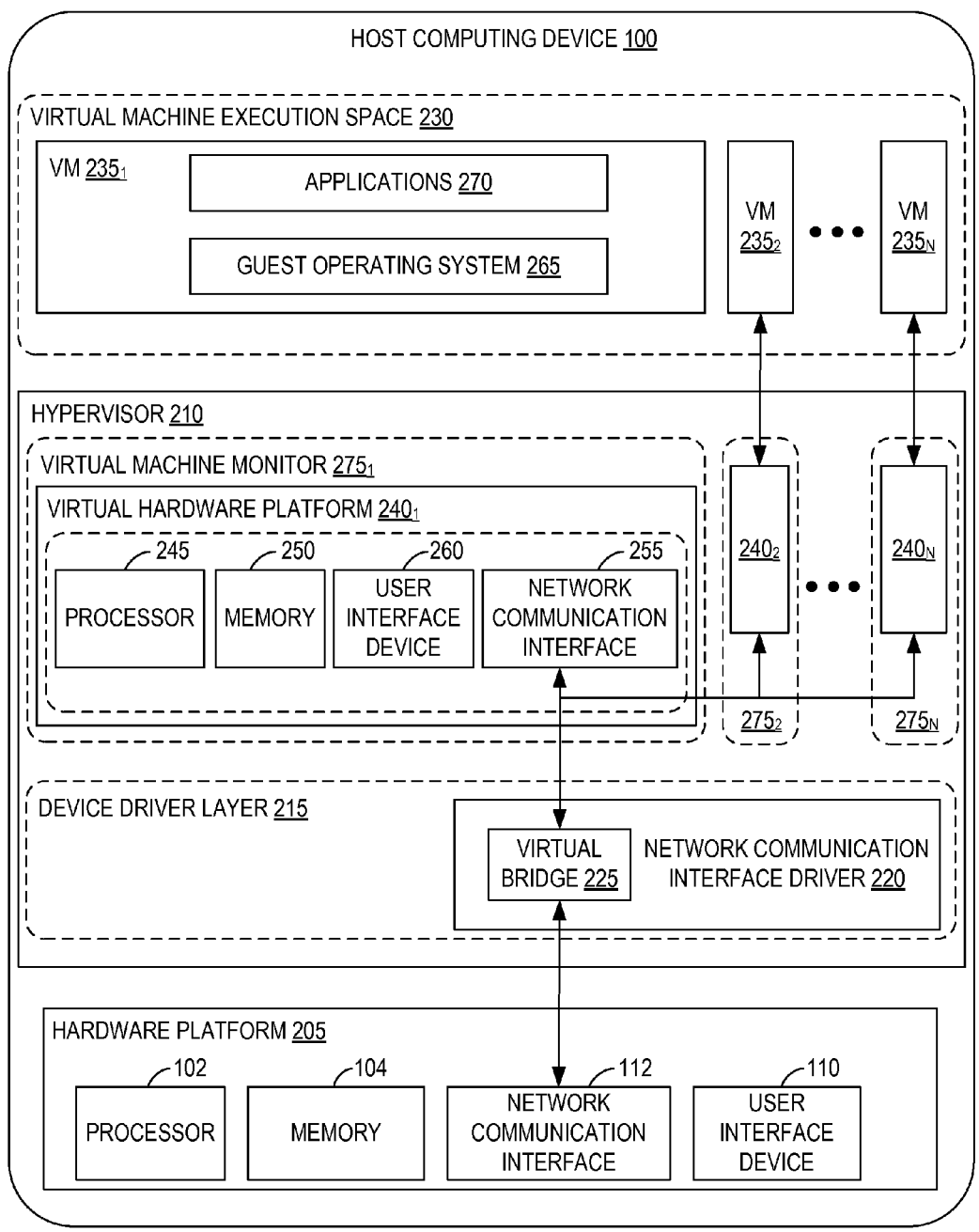
FIG. 2 is a block diagram of virtual machines that are instantiated on a computing device, such as the host computing device shown in FIG. 1.

FIG. 2 depicts a block diagram of virtual machines $235_1$, $235_2$ ... $235_N$ that are instantiated on host computing device 100. Host computing device 100 includes a hardware platform 205, such as an x86 architecture platform. Hardware platform 205 may include processor 102, memory 104, network communication interface 112, user interface device 110, and other input/output (I/O) devices, such as a presentation device 106 (shown in FIG. 1). A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user interface device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware (such as a processor 245, a memory 250, a network communication interface 255, a user interface device 260 and other emulated I/O devices in VM $235_1$). Hypervisor 210 may manage (e.g., monitor, initiate, and/or terminate) execution of VMs $235_1$-$235_N$ according to policies associated with hypervisor 210, such as a policy specifying that VMs $235_1$-$235_N$ are to be automatically restarted upon unexpected termination and/or upon initialization of hypervisor 210. In addition, or alternatively, hypervisor 210 may manage execution VMs $235_1$-$235_N$ based on requests received from a device other than host computing device 100. For example, hypervisor 210 may receive an execution instruction specifying the initiation of execution of first VM $235_1$ from a management device via network communication interface 112 and execute the execution instruction to initiate execution of first VM $235_1$.

In some embodiments, memory 250 in first virtual hardware platform $240_1$ includes a virtual disk that is associated with or "mapped to" one or more virtual disk images stored in memory 104 (e.g., a hard disk or solid state disk) of host computing device 100. The virtual disk image represents a file system (e.g., a hierarchy of directories and files) used by first VM $235_1$ in a single file or in a plurality of files, each of which includes a portion of the file system. In addition, or alternatively, virtual disk images may be stored in memory 104 of one or more remote host computing devices 100, such as in a storage area network (SAN) configuration. In such embodiments, any quantity of virtual disk images may be stored by the remote host computing devices 100.

Device driver layer 215 includes, for example, a communication interface driver 220 that interacts with network communication interface 112 to receive and transmit data from, for example, a local area network (LAN) connected to host computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface for each VM $235_1$-$235_N$, such as network communication interface 255 for first VM $235_1$, may be assigned a unique virtual Media Access Control (MAC) address that enables virtual bridge 225 to simulate the forwarding of incoming data packets from network communication interface 112. In an embodiment, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM in host computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Virtual hardware platforms $240_1$-$240_N$ may be considered to be part of virtual machine monitors (VMM) $275_1$-$275_N$ that implement virtual system support to coordinate operations between hypervisor 210 and corresponding VMs $235_1$-$235_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210. One example of hypervisor 210 that may be used in an embodiment of the disclosure is included as a component in VMware's ESX brand software, which is commercially available from VMware, Inc.

Figure 3:
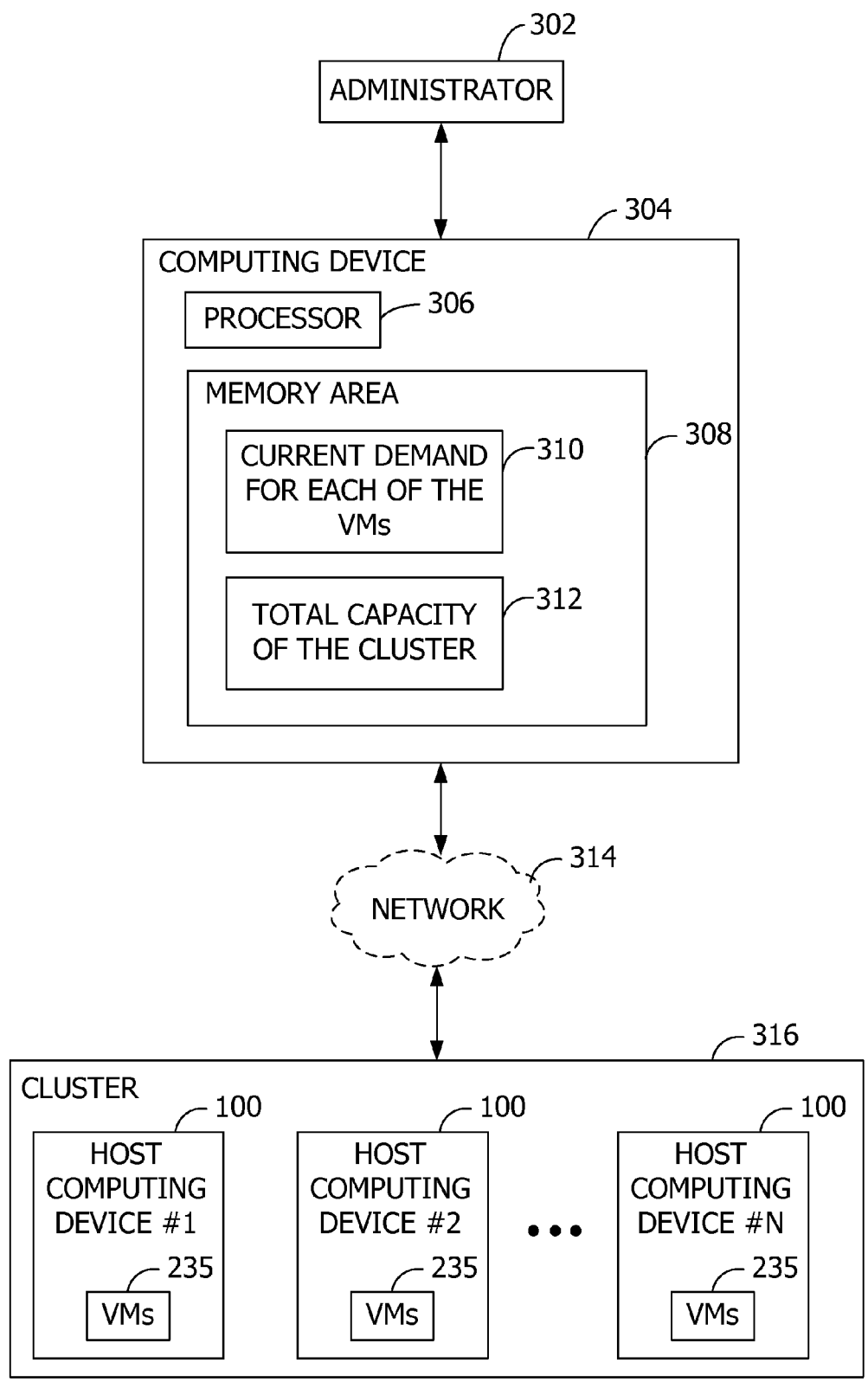
FIG. 3 is a block diagram of an exemplary computing device performing resource management for a cluster of hosts.

FIG. 3 is a block diagram of exemplary computing device 304 for implementing resource management for cluster 316 of host computing devices 100 by allocating spare resources to handle expected demand for a plurality of VMs. In some embodiments, an administrator 302, or other user 108, interacts with computing device 304. Computing device 304 represents any device executing instructions (e.g., as application programs, operating system functionality, or both) to implement the operations and functionality associated with computing device 304. Computing device 304 may include any computing device or processing unit. For example, computing device 304 may represent a group of processing units or other computing devices, such as in a cloud computing configuration.

Computing device 304 communicates with cluster 316 of host computing devices 100, such as host computing device #1 through host computing device #N, via a network 314 or other means. Each of host computing devices 100 executes one or more VMs. Network 314 represents any means for communication between computing device 304 and host computing devices 100. Aspects of the disclosure are operable with any network type or configuration.

Computing device 304 has at least one processor 306 and a memory area 308. Processor 306 includes any quantity of processing units, and is programmed to execute computer-executable instructions for implementing aspects of the disclosure. The instructions may be performed by processor 306 or by multiple processors executing within computing device 304, or performed by a processor external to computing device 304. In some embodiments, processor 306 is programmed to execute instructions such as those illustrated in FIG. 4 and/or FIG. 5.

Memory area 308 includes any quantity of computer-readable media associated with or accessible by computing device 304. Memory area 308, or portions thereof, may be internal to computing device 304, external to computing device 304, or both.

In the example of FIG. 3, memory area 308 stores current demands 310 for each of VMs. Memory area 308 also stores a total capacity 312 of cluster 316. The current demands 310 and total capacity 312 may be calculated, received, or discovered as described herein.

In some embodiments, computing device 304 manages cluster 316 based on resource policies specified by administrator 302 or other user 108. Exemplary resource policies may be defined in terms of absolute VM service rates or relative VM importance. Each VM may have a resource policy specified by reservation, limit, and shares. Reservations and limits may be defined in absolute units (e.g., megahertz for processing resources and megabytes for memory or storage resources) to specify minimum and maximum amounts of resources for allocation to each VM. Shares may be used to specify relative importance and may be expressed as abstract numeric values. In some embodiments, reservations are guaranteed even when cluster 316 is over-committed. Resource policies may also be applied to groups of VMs as logical resource pools to specify an aggregate resource allocation for a set of VMs. In some embodiments, resource pools are nested with one resource pool being a child of another resource pool.

A dynamic entitlement of each VM represents the share of cluster 316 resources that should be allocated to that VM. The dynamic entitlement is calculated by considering reservation, shares, limits, and demands on all the VMs in cluster 316, as if cluster 316 is a single host with a set of resources. Allocation of resources in cluster 316 includes, for example, allocating processing resources and/or memory resources.

Figure 4:
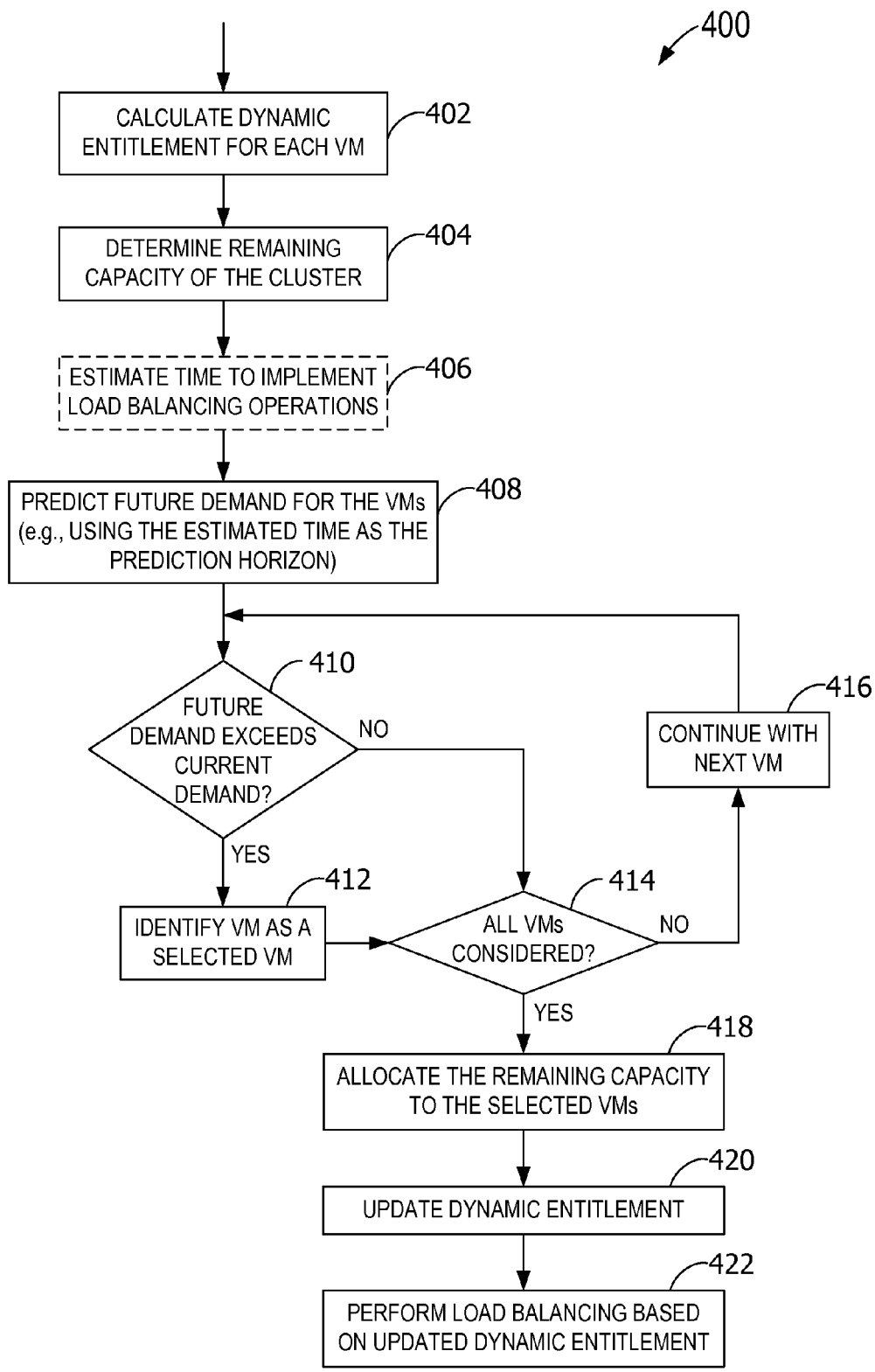
FIG. 4 is a flowchart of an exemplary method performed by the computing device to update dynamic entitlements of VMs based on allocation of excess capacity.
Figure 5:
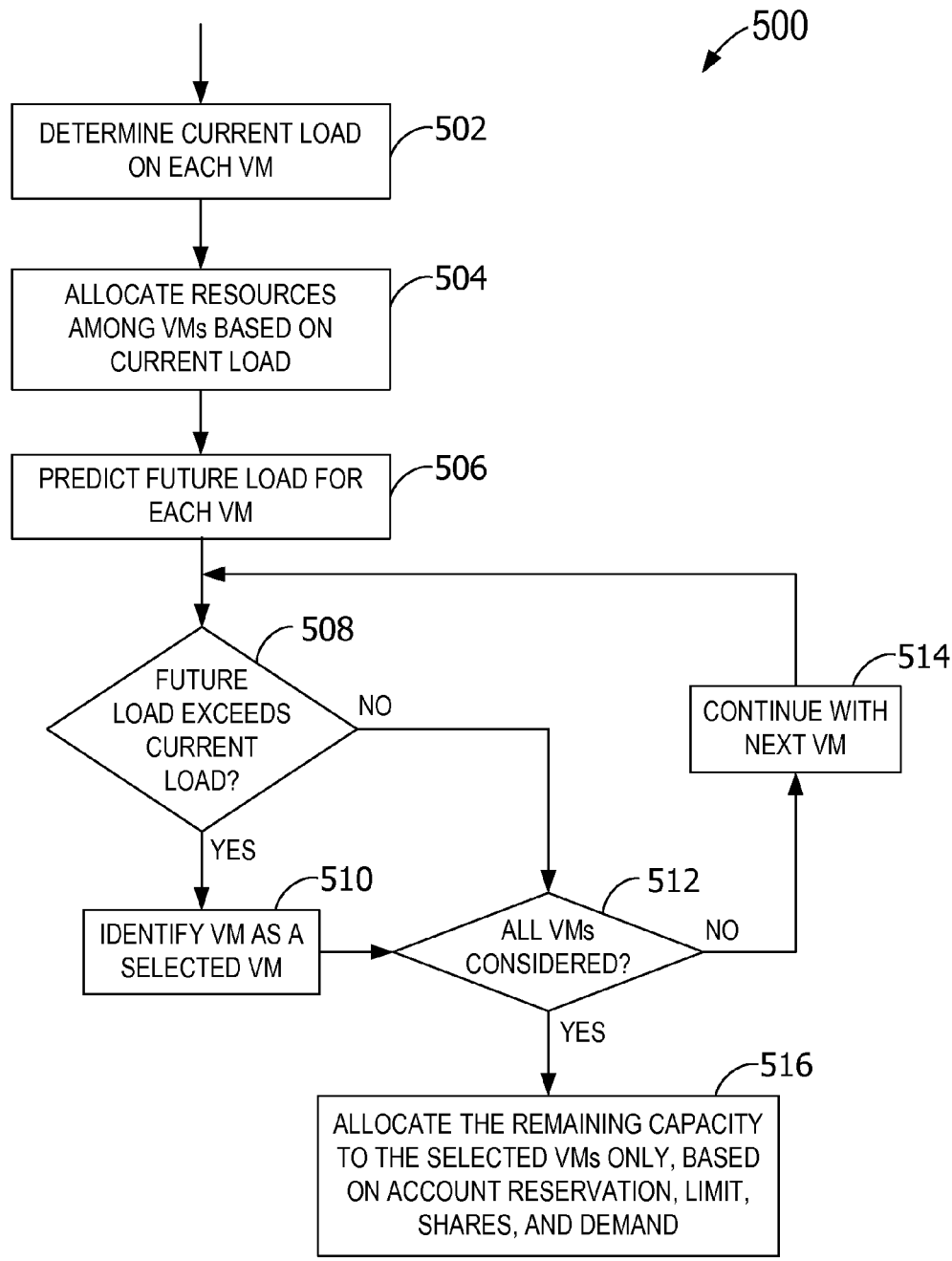
FIG. 5 is a flowchart of an exemplary method performed by the computing device to allocate excess capacity among VMs whose expected future loads exceed current loads.

FIG. 4 and FIG. 5 are flowcharts of exemplary methods performed by computing device 304 to allocate excess capacity. The flowchart in FIG. 4 illustrates updating dynamic entitlements of VMs based on allocation of excess capacity while the flowchart in FIG. 5 illustrates the operations performed when the calculated dynamic entitlement for each VM corresponds to the load on each VM. While method 400 is described with reference to execution by computing device 304 (shown in FIG. 3), it is contemplated that method 400 may be performed by any computing device or execution entity.

The operations illustrated in FIG. 4 execute to perform load balancing operations before the expected demand of VMs increases by predicting the demand for use while calculating the dynamic entitlement (and the normalized entitlement of the host computing device 100). This enables load balancing operations such as migrations to be initiated and completed just prior to the change in demand. In this manner, the load balancing operations are not performed too far in advance in time and do not take away resources from other VMs currently using the resources.

In particular, at 402, a dynamic entitlement is calculated for each of VMs in cluster 316 based at least on current demands for each of VMs. Dynamic entitlement is equivalent to demand when the demands of all VMs in cluster 316 can be met or unless VMs are capped by limit (see FIG. 5). Otherwise, dynamic entitlement represents a scaled-down demand value with the scaling dependent on cluster 316 capacity, the demands of other VMs, the place of each VM in the resource pool hierarchy, and the resource policy of each VM (e.g., shares, reservation and limit).

For a host h, an exemplary, normalized entitlement $N_h$ may be defined as the sum of the per-VM entitlements $E_i$ for all VMs i executing on host h, divided by the host capacity $C_h$ available to VMs, as shown in Equation (1) below.

$$N_h = \frac{\sum E_i}{C_h} \quad (1)$$

At 404, the remaining capacity of VMs in cluster 316 is determined based on the calculated dynamic entitlements for VMs and on the total capacity of cluster 316. The remaining capacity represents capacity that has not been divided or marked for allocation to VMs to satisfy current demands. For example, the remaining capacity is calculated to be the difference between dynamic entitlement for all VMs and the total capacity of cluster 316. In other words, the dynamic entitlement for all VMs is subtracted from the total capacity $C_{capacity}$ to find the remaining capacity or cluster 316 free capacity $C_{free}$, as shown in Equation (2) below.

$$C_{free} = C_{capacity} - \Sigma_i \quad (2)$$

At 406, an optional operation of estimating a duration or other time to implement load balancing operations is performed. For example, the duration for migrating one of VMs may be modeled (e.g., by averaging or other statistical analysis). At 408, computing device 304 predicts a future demand for each of VMs at a future time or other prediction horizon. Aspects of the disclosure are operable with any prediction horizon as input to predicting the future demand. In some embodiments, the future demand may be predicted at a time or over a horizon corresponding to, relative to, or on the same order as a remediation time to correct a load imbalance in cluster 316. For example, the prediction horizon may be based on an estimated duration for implementing load balancing operations. In virtualized embodiments, the estimated duration may correspond to a migration duration associated with migrating VMs from one host computing device 100 to another host computing device 100. In such embodiments, computing device 304 may calculate the migration duration based on, for example, durations of previous migrations in cluster 316. Such a calculation may contemplate raw migration times and any performance degradation of workload inside VMs being migrated as well as the influences of memory-page accesses, network performance, and the sensitivity of the workload to stalls.

In other embodiments, an entity other than computing device 304 may compute the predicted demands for VMs. In such embodiments, computing device 304 obtains, accesses, or otherwise receives the predicted demands.

Operations 410, 412, 414, and 416 operate to identify a set of at least one of VMs having a predicted demand that exceeds the calculated dynamic entitlement for VM. For example, for each of VMs, the current demand for VM is compared to the predicted future demand for VM. If the predicted future demand exceeds the current demand for VM at 410, VM is selected for inclusion in the set of VMs, or otherwise identified as a selected VM at 412. If all VMs have not been considered at 414, processing continues at 416 with another VM (e.g., the current demand and predicted future demand for a next VM are compared).

While the future demands are compared to the current demands for each VM in terms of "exceeds", "greater than," or "greater than or equal to" for simplicity of explanation, aspects of the disclosure are operable with any relative comparison between the future demands and the current demands. For example, one of VMs may be identified if the future demand for VM exceeds the current demand by some factor, threshold value (e.g., percentage threshold), or other mathematical comparison (e.g., identify VM if the future demand is predicted to be 25% greater than the current demand). In another example, the future demand may be compared to a trend, average, running average, mean, or other statistical analysis of historical current demands for each VM. In such an example, computing device 304 stores a history of determined current demands for each VM and performs the statistical analysis.

After all VMs in cluster 316 have been considered at 414, at least a portion of the remaining capacity in cluster 316 is allocated to the selected VMs at 418 (e.g., those VMs whose predicted future demand exceeds the current demand for those VMs). Only the remaining capacity is considered for allocation to the selected VMs to prevent negatively affecting performance of workloads in cluster 316. As an example, the free capacity $C_{free}$ is allocated to those VMs i whose predicted demand $d_i$ is greater than their calculated dynamic entitlement $E_i$, such as shown in Equation (3) below.

$$\text{FutureDemand}_i = d_i - E_i \quad (3)$$

In this manner, VMs i with demand expected to spike beyond the current entitlement $E_i$ receive at least a portion of currently unused resources in cluster 316 based on the reservation, limit, shares, and position in cluster 316 resource pool hierarchy of each VM.

The dynamic entitlement calculated earlier based on the current demands (e.g., see operation 402) is updated at 420 to reflect the allocation of at least a portion of the remaining capacity to the selected VMs. For example, the results of the previously-calculated dynamic entitlement (e.g., based on current demand) are added to the results of the entitlement calculated based on allocation of the unused resources. As such, unused resources in cluster 316 are allocated to VMs to satisfy anticipated spikes in demand only after current demands are satisfied for all VMs in cluster 316. The updated dynamic entitlement of VMs in cluster 316 reflects both the current demands and the predicted demands for VMs to anticipate changes in demand before the changes actually happen, and without any negative impact on performance of current workloads by VMs.

Load balancing is performed at 422 based on the updated dynamic entitlements for VMs. Load balancing includes performing any operation to adjust a determined imbalance among host computing devices 100. An exemplary load balancing algorithm includes a greedy hill-climbing technique. In some embodiments, performing the load balancing includes calculating an imbalance metric value for each of host computing devices 100. Computing each imbalance metric value includes, for example, computing a sum of the dynamic entitlements for VMs executed by one of host computing devices 100 and dividing the sum by a capacity of that host computing device 100. The imbalance metric values for host computing devices 100 may be compared to identify host computing devices 100 to receive additional or fewer resources. For example, a standard deviation, or other statistic, of the imbalance metric values may be computed to compare the loads among host computing devices 100. Resources may be allocated by implementing load balancing operations such as moving VMs from a first host computing device 100 to a second host computing device 100, moving VM disks from one host computing device 100 to another host computing device 100, and/or redirecting incoming data requests from one host computing device 100 to another host computing device 100.

In some embodiments, the calculated dynamic entitlement for each VM corresponds to the load on each VM. Such an embodiment is described next with reference to FIG. 5.

FIG. 5 is a flowchart of an exemplary method performed by computing device 304 to allocate excess capacity among VMs whose expected future loads exceed current loads. While method 500 is described with reference to execution by computing device 304 (shown in FIG. 3), it is contemplated that method 500 may be performed by any computing device or execution entity. For example, one or more computer-readable storage media such as memory area 308 store computer-executable instructions that, when executed by processor 306, cause processor 306 to allocate spare resources to handle predicted loads for a plurality of VMs.

At 502, computing device 304 determines a current load on each of VMs. At 504, computing device 304 allocates resources among VMs based on the determined load. A future load for each of VMs is predicted at 506 based on, for example, a prediction horizon. The prediction horizon may vary and, in some embodiments, the prediction horizon corresponds to a time corresponding to substantially twice a migration duration associated with VMs. Such a prediction horizon enables computing device 304 to perform any load balancing prior to a time corresponding to occurrence of the predicted future loads.

In other embodiments, an entity other than computing device 304 may compute the predicted loads for VMs. In such embodiments, computing device 304 obtains, accesses, or otherwise receives the predicted loads.

Based on the predicted future loads, one or more of VMs are identified. In some embodiments, the identified VMs are those VMs whose predicted load is approximately greater than the corresponding current determined load. For example, operations 508, 510, 512, and 514 operate to identify a set of at least one of VMs having a predicted future load that exceeds the determined current load for VM. For example, for each of VMs, the current load for VM is compared to the predicted future load for VM. If the predicted future load exceeds the current load for VM at 508, VM is selected for inclusion in the set of VMs, or otherwise identified as a selected VM at 510. If all VMs have not been considered at 512, processing continues at 514 with another VM (e.g., the current load and predicted future load for a next VM are compared).

While the future loads are compared to the current loads in terms of "exceeds", "greater than," or "greater than or equal to" for simplicity of explanation, aspects of the disclosure are operable with any relative comparison between the future loads and the current loads. For example, one of VMs may be identified if the future load for VM exceeds the current load by some factor, percentage threshold, or other mathematical comparison (e.g., identify VM if the future load is predicted to be 25% greater than the current load). In another example, the future load may be compared to a trend, average, running average, mean, or other statistical analysis of historical current loads for each VM.

After all VMs in cluster 316 have been considered at 512, at least a portion of the remaining capacity in cluster 316 is allocated only among the selected VMs at 516 (e.g., those VMs whose predicted future load exceeds the current load for those VMs) to enable the selected VMs to manage their predicted future loads. Only the remaining capacity is considered for allocation to the selected VMs to prevent negatively affecting performance of current workloads in cluster 316. For example, considering only the remaining capacity for allocation among only the selected VMs avoid clipping the determined current loads. As there may not be enough spare capacity to fund the future demand for all the VMs, allocation of the excess capacity takes one or more of the following into account: reservation, limit, shares, and demand.

In some embodiments, operation 516 is performed only when the remaining capacity exceeds a threshold value. For example, the threshold value may represent an amount of resources (e.g., processing resources, memory resources, etc.) that is reserved, or otherwise not for allocation (e.g., 10% of the total resources of cluster 316).

In some embodiments, computing device 304 determines the remaining capacity in cluster 316 after allocation of resources based on current load. In other embodiments, computing device 304 obtains, accesses, or otherwise receives values indicating the remaining capacity. For example, computing device 304 may query another entity responsible for determining values associated with memory resources and processing resources of cluster 316.

Experimental Results

The following scenarios and results are merely exemplary and not intended to be limiting in any way. A simulator creates different VM and host profiles for experimentation and evaluation of various proactive resource scheduling schemes. VM may be defined as a quantity of virtual central processing units (vCPUs), configured CPU (in megahertz), and configured memory size (in megabytes). The host may be defined using parameters such as physical cores, CPU (in megahertz) per core, total memory size, power consumption when idle, etc.

Based on exemplary physical characteristics of hosts, VM resource demands, and VM resource specifications, the simulator mimics resources schedulers to allocate processing and memory resources to VMs in an exemplary cluster such as cluster 316. The simulator generates workload demand predictions (e.g., processing and memory demand) for VMs based on arbitrary workload specifications for each VM over time, supports resource controls such as reservation, limit and shares for each VM along with the resource pools, generates the allocation each VM receives, and makes resource scheduling decisions.

To evaluate the effective allocation of resources, aspects of the disclosure contemplate the simulator calculating a cumulative missed demand metric. An exemplary cumulative missed demand metric is defined as shown in Equation (4) below.

$$\Sigma_{t=1}^{T} \Sigma_{k=1}^{All\ VMs} (\text{Unsatisfied demand for VM}_k \text{ at } t) \quad (4)$$

In this exemplary metric, T denotes a total simulation time for an experiment. The metric is calculated separately for each resource, such as for a processing resource and a memory resource. For example, the processing resource missed demand is the area under the curve per Equation (4) when a difference between what VM demands as the processing resource and what VM gets on the host is plotted in time. In this example, the metric captures the cumulative number of processing cycles requested by VMs but not satisfied by the hosts. In this example, a lower number is better.

In some embodiments, the simulator generates workload demand predictions based on an input parameter control how far ahead the simulator should look in the future. The predicted demand may be obtained by taking a maximum value in an exemplary future lead-time window [$W_{low}$, $W_{high}$] (in seconds). For example, if $W_{low}$ is set to 300 seconds and $W_{high}$ is set to 800 seconds, the maximum predicted value after 300 seconds from now but before 500 seconds from then is set as the predicted demand. Errors in the prediction are introduced with an error percentage that increases the demand of some VMs while decreasing the demand of other VMs by the same percentage. In this manner, all values are either higher or lower than a perfect prediction by the specified percentage.

A non-opportunistic proactive resource scheduling scheme, an opportunistic proactive resource scheduling scheme, and a reactive resource scheduling scheme were modeled by the simulator. For the non-opportunistic proactive resource scheduling scheme, the dynamic entitlement was calculated using predicted demand. This results in changes in VM demand appearing in the entitlement before the changes occur irrespective of current loads, leading to clipped demand in some cases.

For the opportunistic proactive resource scheduling scheme, the dynamic entitlement was calculated using current demand and, if any additional cluster resources were unused, another round of resource allocation occurred to give the unused resources to VMs expected to have a spike in demand.

For the reactive resource scheduling scheme, the dynamic entitlement was calculated based solely on current demand, with no regard to predicted demands.

In some experiments, the cluster included 15 hosts each with 5 VMs. The workload used inside VMs mimicked a diurnal pattern in which values were normally distributed around 1000 MHz with a variance of 1000 MHz for the first 600 seconds. For the next 600 seconds, the values were distributed around 600 MHz with a variance of 500 MHz. The entire cluster in some experiments was about 60% utilized even though, due to the distribution of VMs, some hosts may be overloaded while other hosts may have many spare resources.

The results of inaccurate predictions are described next with reference to FIG. 6.

Figure 6:
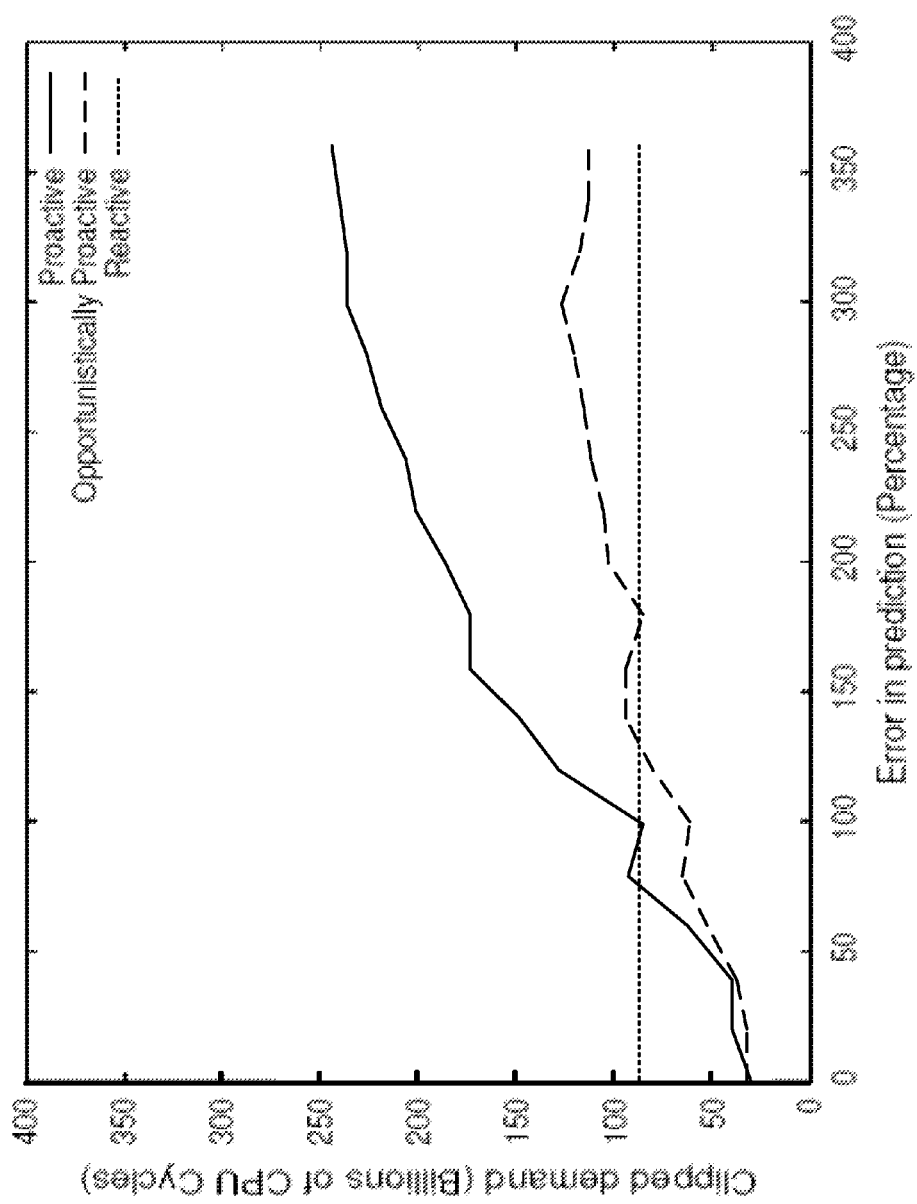
FIG. 6 is a graph illustrating an exemplary effect of inaccurate predictions on clipped processing resources using different resource management schemes.

FIG. 6 is a graph illustrating an exemplary effect of inaccurate predictions on clipped processing resources using different resource management schemes. In this example, the future lead-time window in the simulator was fixed at $[W_{low}=100, W_{high}=800]$ seconds and the predicted demand is chosen as the maximum value in this window. The lead-time window was chosen in this example because it corresponds to the worst case time needed to fix a load imbalance in this example scenario (e.g., about 600 seconds).

The same experiment was run multiple times with the same random seed to produce the same workload pattern inside VMs for each run, while varying the prediction error rates. In this example, each run lasted four hours and the prediction error rates increased for each run. Total clipped demand was measured for the entire cluster. For each error percentage, the runs were repeated for the naïve proactive, opportunistically proactive, and reactive resource scheduling schemes.

As shown in FIG. 6, the opportunistically proactive scheme (such as described with reference to FIG. 4 and FIG. 5) performs almost the same or better (e.g., in terms of clipped demand) as the other schemes when the prediction error is below 200%. Even when there is very high error, the opportunistically proactive scheme performs much better compared to the naive proactive scheme. This robustness helps when prediction inaccuracies increase unexpectedly in virtualized private cloud environments.

The effects of adjusting the prediction horizon are described next with reference to FIG. 7.

Figure 7:
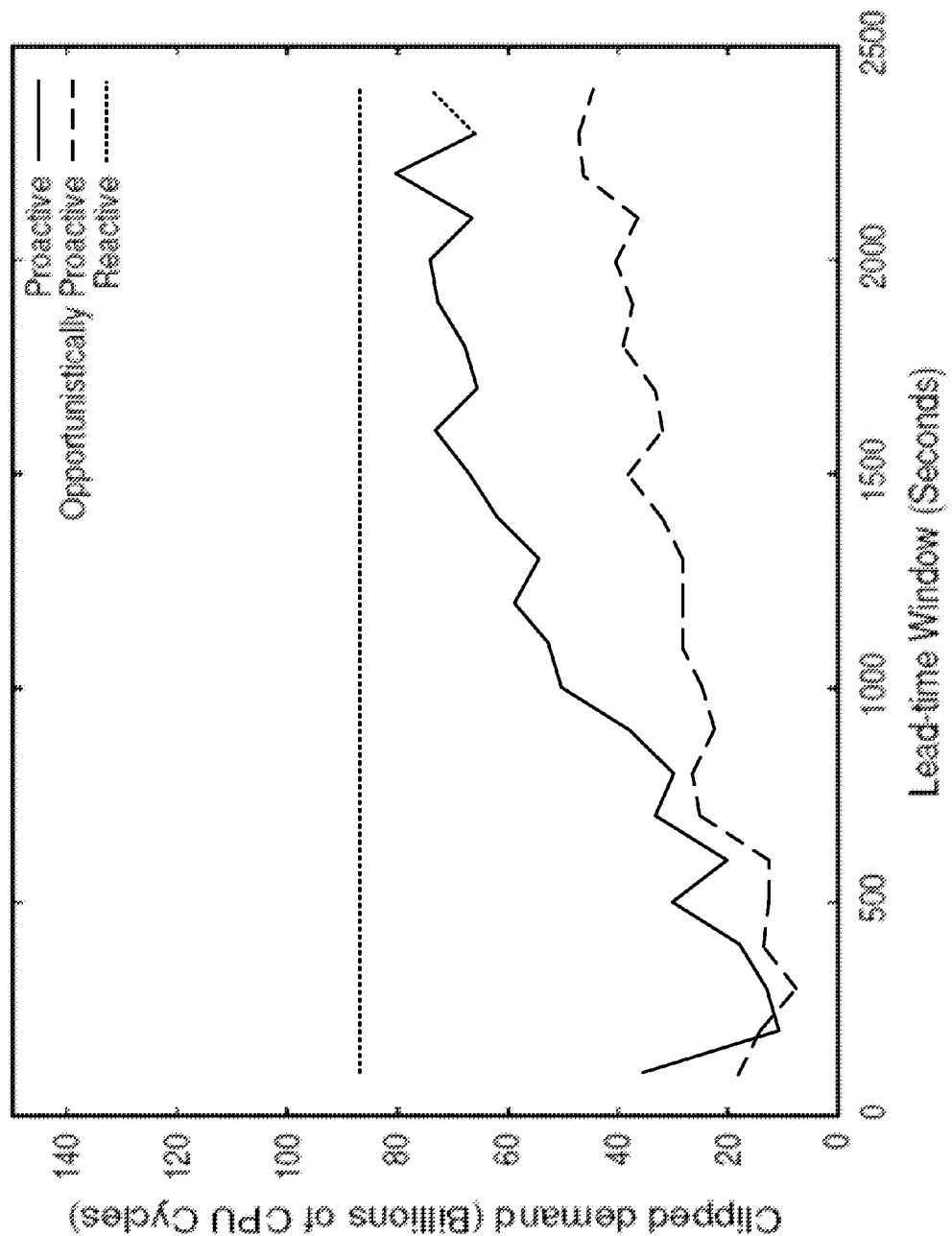
FIG. 7 is a graph illustrating an exemplary effect of increased prediction horizon on demand clipping using different resource management schemes.

FIG. 7 is a graph illustrating an exemplary effect of increased prediction horizon on demand clipping using different resource management schemes. In this example, the lead-time window $[W_{low}, W_{high}]$ was adjusted by varying $W_{high}$ from 100 seconds to 2400 seconds while keeping $W_{low}$ at 100 seconds. In the example graph in FIG. 7, the x-axis represents multiple runs of the same experiment with different lead-time parameter for each run.

As shown in FIG. 7, as prediction look-ahead (e.g., lead-time) increases, the opportunistic proactive scheme results in lower clipped demand than either of the other two schemes. For example, as $W_{high}$ (e.g., the prediction horizon) increases, the naive proactive scheme moves VMs around in anticipation of future events prematurely. This sacrifices current demand to meet a much farther future demand leading to implementing premature load balancing operations and demand clipping even when predictions are perfect. Clipping occurs, for example, when resources are taken away from some VMs to fund expected future demand by other VMs.

Additional Examples

Aspects of the disclosure are also applicable to power management and VM disk migrations. For power management, calculating dynamic entitlement based on future predictions in power use enables opportunistically proactive power operations to be performed to accommodate anticipated power load changes. For VM disk migrations, the prediction help avoid overprovisioning of disk bandwidth.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, exclude propagated data signals, and are mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The embodiments illustrated and described herein as well as embodiments not specifically described herein but within the scope of aspects of the invention constitute exemplary means for opportunistically proactive resource management by redistributing only the determined remaining capacity of the plurality of VMs, and exemplary means for opportunistically proactive resource management in a virtualized datacenter by performing load balancing based on the updated, calculated dynamic entitlement. For example, processor 306 programmed to execute the operations as described herein constitutes these exemplary means.

At least a portion of the functionality of the various elements illustrated in the figures may be performed by other elements in the figures, or an entity (e.g., processor, web service, server, application program, computing device, etc.) not shown in the figures.

In some embodiments, the operations illustrated in the figures may be implemented as software instructions encoded on at least one computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A system for allocating spare resources to handle expected demand for a plurality of virtual machines (VMs), said system comprising:
    a memory area associated with a computing device, said memory area storing current demands each corresponding to one of the plurality of VMs, the memory area further storing a total capacity for the plurality of VMs; and
    a processor programmed to:
        calculate a dynamic entitlement for each of the plurality of VMs based on the current demands corresponding thereto;
        determine remaining capacity for resources of the plurality of VMs based on the calculated dynamic entitlement for the plurality of VMs and the total capacity for resources stored in the memory area;
        predict a future demand for each of the plurality of VMs;
        identify one or more of the plurality of VMs with predicted demands exceeding the corresponding current demands, the predicted demands being at a time corresponding to substantially twice a migration duration associated with the plurality of VMs; and
        update the calculated dynamic entitlement by allocating at least a portion of the determined remaining capacity to the identified one or more of the VMs.

2. The system of claim 1, wherein the processor is programmed to calculate the dynamic entitlement for each of the plurality of VMs by allocating resources to each of the plurality of VMs.

3. The system of claim 2, wherein allocating at least a portion of the resources comprises allocating one or more of the following: memory resources and processing resources.

4. The system of claim 1, further comprising calculating the migration duration associated with the plurality of VMs.

5. The system of claim 1, wherein the predicted future demands are inaccurate.

6. The system of claim 1, wherein the processor is programmed to determine the remaining capacity by identifying a quantity of the resources not allocated to the plurality of VMs based on the current demands.

7. The system of claim 1, wherein the processor is further programmed to perform load balancing based on the updated, calculated dynamic entitlement.

8. The system of claim 1, further comprising means for opportunistically proactive resource management by distributing only the determined remaining capacity of the plurality of VMs.

9. The system of claim 1, further comprising means for opportunistically proactive resource management in a virtualized datacenter by performing load balancing based on the updated, calculated dynamic entitlement.

10. A method comprising:
    calculating, by a computing device, a dynamic entitlement for each of a plurality of virtual machines (VMs) based on current demands corresponding thereto;
    determining remaining capacity of the plurality of VMs based on the calculated dynamic entitlement for the plurality of VMs;
    identifying, by the computing device, one or more of the plurality of VMs with predicted demands exceeding the corresponding current demands, the predicted demands being at a time corresponding to substantially twice a migration duration associated with the plurality of VMs; and
    updating, by the computing device, the calculated dynamic entitlement by allocating at least a portion of the determined remaining capacity to the identified one or more of the VMs.

11. The method of claim 10, further comprising performing load balancing based on the updated, calculated dynamic entitlement.

12. The method of claim 11, wherein performing load balancing comprises one or more of the following: moving one or more of the VMs from a first host to a second host, and redirecting data requests from the first host to the second host.

13. The method of claim 10, wherein updating the calculated dynamic entitlement comprises updating the calculated dynamic entitlement by allocating only the determined remaining capacity to only the identified one or more of the VMs.

14. The method of claim 10, wherein identifying the one or more of the plurality of VMs comprises identifying at least one of the VMs having a predicted demand exceeding the calculated dynamic entitlement for the VM.

15. The method of claim 10, further comprising calculating the predicted demands for the each of the plurality of VMs.

16. The method of claim 10, wherein determining the remaining capacity of the plurality of VMs comprises subtracting the calculated dynamic entitlement from a total capacity associated with the plurality of VMs.

17. The method of claim 10, wherein identifying the one or more of the plurality of VMs comprises identifying one or more of the plurality of VMs having the predicted demand greater than the current demand by a threshold value.

18. One or more computer-readable storage media including computer-executable instructions that, when executed, cause at least one processor to allocate spare resources to handle predicted loads for a plurality of virtual machines (VMs) by:

determining a current load on each of the plurality of VMs;
allocating resources among the plurality of VMs based on the determined current load;
predicting a future load for each of the plurality of VMs at a time corresponding to substantially twice a migration duration associated with the plurality of VMs;
identifying one or more of the plurality of VMs having the predicted future load greater than the determined current load; and
allocating at least a portion of remaining resources only among the identified one or more of the plurality of VMs to enable the identified one or more of the plurality of VMs to manage the predicted future loads corresponding thereto.

19. The computer storage media of claim 18, wherein the computer-executable instructions further cause the processor to:

determine a quantity of the remaining resources; and
allocate the remaining resources only when the determined quantity of remaining resources exceeds a threshold value.

20. The computer storage media of claim 18, wherein the computer-executable instructions cause the processor to allocate at least a portion of remaining resources only among the identified one or more of the plurality of VMs to avoid clipping the determined current loads.

* * * * *